(12) United States Patent
Blochmann

(10) Patent No.: US 8,262,384 B2
(45) Date of Patent: Sep. 11, 2012

(54) APPARATUS FOR BLOW MOULDING PLASTIC PREFORMS HAVING A REDUCED DEAD VOLUME

(75) Inventor: Erik Blochmann, Neutraubling (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 12/776,720

(22) Filed: May 10, 2010

(65) Prior Publication Data

US 2010/0285169 A1 Nov. 11, 2010

(30) Foreign Application Priority Data

May 11, 2009 (DE) .......................... 10 2009 020 738

(51) Int. Cl.
*B29C 49/58* (2006.01)
(52) U.S. Cl. ....................................................... 425/535
(58) Field of Classification Search .................. 425/535, 425/538
See application file for complete search history.

(56) References Cited

U.S. PATENT DOCUMENTS

| | | | | |
|---|---|---|---|---|
| 4,790,741 | A * | 12/1988 | Takakusaki et al. .......... | 425/526 |
| 6,099,790 | A * | 8/2000 | Wehrens et al. .............. | 264/542 |
| 7,674,108 | B2 * | 3/2010 | Lemaistre ..................... | 425/535 |
| 7,803,311 | B2 * | 9/2010 | Finger et al. .................. | 264/526 |
| 7,927,093 | B2 * | 4/2011 | Leblond et al. ............... | 425/529 |
| 7,959,428 | B2 * | 6/2011 | Lemaistre ..................... | 425/182 |
| 2003/0118686 | A1 | 6/2003 | Voth et al. | |
| 2004/0265416 | A1* | 12/2004 | Woods et al. ................. | 425/535 |
| 2008/0069914 | A1* | 3/2008 | Lemaistre ..................... | 425/146 |
| 2008/0213423 | A1 | 9/2008 | Leblond et al. | |

FOREIGN PATENT DOCUMENTS

DE 19938724 A1 2/2001
(Continued)

OTHER PUBLICATIONS

Search Report for EP 10 16 2112, mailed Oct. 7, 2010.

*Primary Examiner* — Robert B Davis
(74) *Attorney, Agent, or Firm* — Rissman, Hendricks & Oliverio, LLP

(57) ABSTRACT

A blow molding apparatus for expanding plastic preforms into plastic containers may include a blow piston extending in a longitudinal direction and a blow nozzle extending from the blow piston in the longitudinal direction. The blow nozzle may be configured to apply a gaseous medium to a preform for the expansion thereof. A connection device may be structured and arranged to supply the gaseous medium to the blow molding apparatus via at least two connection lines, and a control block may be arranged between the connection device and the blow piston. The control block may be configured to control the supply of the gaseous medium during the expansion process using at least partially varying pressure levels and may have a plurality of channels for guiding the gaseous medium. The plurality of channels may be separated from each other at least in sections and may be distributed in a circumferential direction of the control block. At least two valves may be on an outer circumference of the control block. The valves may be distributed in a circumferential direction around the control block, and may be controlled independent of one another for controlling the supply of the gaseous medium to the blow nozzle. A distribution member may be configured to guide the gaseous medium into said channels. The distribution member may be arranged between the connection device and the control block if viewed in the flow direction of the gaseous medium. The channels may extend within the control block at least in sections substantially parallel to the longitudinal direction of the blow piston.

12 Claims, 10 Drawing Sheets

FOREIGN PATENT DOCUMENTS

| | | |
|---|---|---|
| DE | 200 18 500 U1 | 1/2002 |
| FR | 2 872 082 A1 | 12/2005 |
| WO | 2006096460 A1 | 9/2006 |
| WO | 2007107016 A1 | 9/2007 |
| WO | 2008040388 A1 | 4/2008 |

* cited by examiner

US 8,262,384 B2

APPARATUS FOR BLOW MOULDING PLASTIC PREFORMS HAVING A REDUCED DEAD VOLUME

CROSS-REFERENCE TO RELATED APPLICATION

This application claims the benefit of priority of German Patent Application No. 10 2009 020 738.4, filed May 11, 2009, pursuant to 35 U.S.C. 119(a)-(d), the disclosure of which is incorporated herein by reference in its entirety as if fully set forth herein.

TECHNICAL FIELD

The present disclosure relates to an apparatus for blow moulding plastic preforms into plastic containers and, more particularly, an apparatus for blow moulding plastic performs having a reduced dead volume.

BACKGROUND

Apparatuses for blow moulding plastic performs into plastic containers have been known from the prior art for a long time. It is specifically known here to apply a gaseous medium and in particular pressurised air to the plastic preforms, in order to expand them in this way into plastic containers within a blow mould. During these blow moulding processes, different pressure levels are used, such as for example a preblow pressure and a main blow pressure and the like. Therefore, several valves which control the pressurised air supply to the container are required, in order to apply the individual pressure levels to the plastic containers.

WO2006/096460 A1 describes a blow air control system. This blow air control system controls the injection of a first gas under a first pressure into the inside of a plastic preform and subsequently the injection of a second gas under a second pressure, which is higher than the first pressure, into the inside of the plastic preform.

WO2007/107016 A1 describes a blow station for a stretch blow moulding machine. Here, a rotary distributor for compressed air and a plurality of blow moulding stations are provided, which are radially arranged about a rotary axis of the distributor. In each station, individual valves are arranged in a single blow moulding block which is disposed laterally on a blow cylinder.

A valve assembly for cavity blow moulding machines and a method for blowing are known from WO2008/040388 A1. Here, too, a preblow valve and a main blow valve are provided, in order to generate a blow volume at different pressure levels. Here, the preblow valve and the main blow valve are arranged to act in parallel relative to each other and the preblow valve is implemented as a multi-way valve, with the first inlet line having a throttle and a check valve acting against the supply direction.

U.S. 2008/0213423 A1 describes a fluid flow control assembly for a container blow moulding machine. Here, all of the individual valves are arranged on the front surface of a housing for a blow nozzle.

From DE 199 38 724 A1, an apparatus for producing plastic containers by means of stretch blow moulding is known. Here, a container to be produced is held by its open end by means of a receptacle, and this receptacle can be brought into engagement at the end thereof which faces away from the container with a distributor block in a fluid-tight manner, and the stretch plug is guided through the distributor block in an actual extension of this receptacle in a movable manner.

During the manufacture or construction of such systems efforts are always made to keep the necessary energy expenditure for running the systems as low as possible. The valve blocks for such apparatus usually have an air connection plate, an air distribution plate, a control block, blow valves, a blow piston as well as a connection for a silencer as well as a blow slide. As a result of the design known from the prior art, usually so-called dead volumes are formed here, in particular downstream of the valves, which means in the blow chamber or in the supply line to the blow chamber. These dead volumes are detrimental to the operation of such an apparatus, since they would first have to be filled with pressurised air, before the actual moulding process can be carried out.

It may therefore be desirable to design an apparatus for moulding plastic containers to be more energy efficient. For example, the above-mentioned dead volumes for the blow air may be reduced. Further, it may be desirable to realize reproducible blow moulding processes, in particular from one blow station to another blow station.

SUMMARY OF INVENTION

A blow moulding apparatus according to the disclosure for expanding plastic preforms into plastic containers comprises a blow nozzle arranged on a blow piston extending in a predetermined longitudinal direction, in order to apply a gaseous medium to it with a view to expanding it. Further, the apparatus comprises a connection device in order to supply the gaseous medium to the blow moulding apparatus by means of at least two connection lines. Further, a control block is provided which is disposed between the connection device and the blow piston if viewed in the flow direction of the gaseous medium and which controls the supply of the gaseous medium during the expansion process using at least partially varying pressure levels. Here, the control block has a plurality of channels for carrying the gaseous medium, which are separated from each other at least in sections, and these channels are distributed in a circumferential direction of the control block. The blow nozzle may be applied to an outlet of the plastic preform. However, it would also be conceivable to apply the blow nozzle to a blow mould.

According to the disclosure, at least two and generally a plurality of valves which may be controlled independently from each other are arranged on an outer perimeter of the control block and are distributed in this circumferential direction around this control block, for controlling the supply of the gaseous medium to the blow nuzzle. Further, the apparatus has distribution member which distribute the gaseous medium to the individual channels or guide (or direct) them into the latter, which distribution member are arranged between the connection means and the control block if viewed in the flow direction of the gaseous medium, and wherein the individual channels extend, at least in sections, essentially parallel to the longitudinal direction of the blow piston within the control block. The circumferential direction of the control block is to be understood to mean in particular a direction extending vertically relative to an axis of the blow piston. The connection means may be any means which allow the connection of a media supply.

The blow nozzle may here be sealed against the plastic preform in several ways. Thus, it would be conceivable for the blow nozzle to be sealed against the plastic preform on an outer perimeter of the thread of the plastic preform and/or on an upper edge of the thread. It would also be conceivable to provide a seal relative to the inside wall of the thread section of the plastic preform. As an alternative or in addition, a seal could also be provided relative to the supporting ring of the plastic preform. Finally, it would also be conceivable that the sealing of the blow nozzle is not provided or not only relative to the plastic preform, but opposite a blow mould in which the plastic preform is received during the expansion process A sealing could be provided here, for example, relative to an upper surface of this blow mould.

The gaseous medium may particularly be air, more specifically pressurised air, by means of which the plastic preforms may be expanded into the plastic containers. The blow piston may move here together with the blow nozzle towards the plastic preform and may seal the latter during the expansion process.

The pressurised air may be supplied via the individual connection lines at different pressure levels. These connection lines may each be guided here separately from each other to the above-mentioned channels or valves as early as in the distribution block. The individual valves may be actuated during the expansion process in a specified manner, and in this way, a blow moulding process as desired by the user for moulding the plastic preforms into containers may be achieved. In this way, reproducible blow moulding processes may also be achieved.

By means of the features mentioned within the context of the characterising portion in combination it is achieved that downstream of the valves only a small dead volume is created, so that in this way pressurised air may be saved in the manufacture of the plastic containers. Thus, the apparatus according to the disclosure provides such an arrangement of modules as to allow a low dead volume in the valve block to be achieved. On the one hand, by means of the valves arranged in the circumferential direction, a respectively very short valve or channel path for supplying the medium to the plastic preform may be achieved. As a result of the fact that the channels still extend essentially parallel to the longitudinal direction of the blow piston, any transverse bores delivering the pressurised air may be essentially dispensed with, and in this way too, the dead volume may be reduced. More specifically, the respective channel sections between the valves and the blow piston are kept very short.

The above-mentioned channels may be realised, for example, as bores or also as grooves or elongate holes. The cross section of these channels may be circular or oval. If grooves are used as channels, these channels may be guided even closer to the blow piston at a constant flow.

Due to the circumferential arrangement of the blow valves, the apparatus according to the disclosure furthermore allows the generation of one or more additional pressure levels which in turn may be used to save air during the blow moulding process. Furthermore, due to this design, an optimised flow configuration of the air flow for minimising blow moulding times is made possible, and here the pressurised air may for example be recycled or the air duct for the exhaust air present may be designed in a simple manner.

As mentioned above, such a valve block may comprise at least an air connection plate, an air distribution plate, a control block, the blow valves and the blow piston. Apart from that, also a blow slide, a silencer and a connection for this silencer may be provided. The connection for the air supply for the blow moulding process as well as, if required, a pilot air supply is provided via the above-mentioned air connection plate to the air distribution plate or the distribution member. However, it would also be possible to dispense with the air connection plate and to provide a direct arrangement of the corresponding connections.

Here, the distribution member may be disposed adjacent to the control block and direct the various pressure connections to the blow chamber or the blow piston. If the preform is expanded with its opening facing upwards, the air distribution member is therefore disposed above the control block. By means of this arrangement, any transverse bores in the control block may be avoided and the blow valves may therefore be mounted close to the blow chamber. This in turn avoids or reduces any dead volumes in the blow chamber or dead volumes in the supply line to the blow chamber. Moreover, the reduction of the dead volume will also enhance the indexing accuracy of the apparatus according to the disclosure.

In an exemplary embodiment, the channels extend up to the valves exclusively essentially parallel to the above-mentioned longitudinal direction within the control block. Thus, any transverse bores are completely eliminated within the control block, as a result of which again dead volumes may be reduced. The term essentially parallel is understood to mean any direction which deviates by no more than 10°, for example, no more than 5° from the geometrical longitudinal direction.

In an exemplary embodiment, at least one exhaust outlet for the gaseous medium is disposed on the outer perimeter of the control block. A silencer, which reduces any noise generated when air exits, may be mounted on this exhaust outlet. Thus, the silencer is here directly connected to the control block via a connection, so that any dead times for the discharge are reduced.

In an exemplary embodiment, a blow chamber is provided between the blow piston and the control block, into which the individual channels or any connection lines forming part of these channels may open. More specifically, the blow chamber is disposed here above the actual blow piston, so that an additional annular chamber around the piston, as is present in the prior art, is eliminated. In this way, dead space may be reduced.

In an exemplary embodiment, the blow chamber is directly joined on to the valves. This means that the valves are disposed in the immediate vicinity of the above-mentioned blow chamber. In this way, the air ducting distance between the valves and the blow chamber may be reduced even further and also dead space may be reduced further.

In some aspects, at least one valve unit is in flow communication with the blow piston via two connection channels separated from each other at least in sections. Thus, the air supply of a valve may be implemented as a channel and the continuation downstream of the valve may comprise two such channels. The dead space to be reduced according to the disclosure causes, if present, a more unfavourable air distribution in the blow piston. The two above-mentioned connection channels or lines may in turn effect an improved circulation or air distribution in the blow piston.

In various aspects, the two connection channels are arranged symmetrically with regard to a geometrical connection line between the control block and the respective valve. In some aspects, a supply line for the air to the valve is provided along this geometrical connection line. This symmetrical arrangement results in a uniform distribution of the respective air to the blow piston. It is to be noted that this symmetrical arrangement may also be used independently from the above features.

A corresponding further blow moulding apparatus according to the disclosure for expanding plastic preforms into plastic containers has a blow nozzle arranged on a blow piston extending in a predetermined longitudinal direction, in order to apply a gaseous medium thereon with a view to expanding the same. Further, the apparatus includes a connection device in order to supply the gaseous medium to the blow moulding apparatus by means of at least two connection lines. Further, a control block is provided which is disposed between the connecting device and the blow piston if viewed in the flow direction of the gaseous medium and which controls the supply of the gaseous medium during the expansion process using at least partially varying pressure levels. According to the disclosure, the control block has a plurality of channels separated from each other at least in sections for carrying the gaseous medium, and these channels may be distributed in a circumferential direction of the control block. Further, the channels or connection lines, which form part of these channels, are arranged symmetrically with regard to a geometrical connection line between the control block and the respective valve.

In an exemplary embodiment, the apparatus has a connection for supplying a gaseous medium for controlling at least one valve. More specifically, in this embodiment at least one valve and, for example, several valves may be actuated by means of control air. However, it would also be conceivable to actuate the individual valves by electrical means.

In an exemplary embodiment, the apparatus has a rod body which is movable relative to the blow piston in the longitudinal direction for expanding the plastic preforms. These rod-shaped bodies are the stretching rods which are also known in the prior art and which are used for stretching the plastic preforms. In this embodiment, the entire apparatus is an integral part of a so-called stretch blow moulding machine.

In an exemplary embodiment, the apparatus has throttling means arranged between the connecting device and at least one valve if viewed in the flow direction of the gaseous medium. These throttling means may be adjustable with regard to their throttling action.

In some aspects, the apparatus also includes a check valve parallel to the throttling means.

More specifically, in this embodiment an adjustable throttle as well as a check valve are provided in the so-called P1 air duct. The throttle and the check valve are, as mentioned, disposed upstream of the actual blow valve. One advantage of this arrangement is that by throttling the check valve or even the supply lines thereof, no additional dead volume is generated in the assembly.

However, it is to be noted that the throttle and in particular also the arrangement thereof between the connection device and at least one valve are applied independently from the disclosure as claimed above or in the stretch blow moulding machines known from the prior art.

The P1 air duct may be used for preblowing the plastic preforms. The blow moulding process for generating the so-called preblown parison is adjusted, amongst other means, by means of the throttle. With a view to recycling in the above-mentioned P1 air stream, the check valve is additionally opened. In this way, the time for recycling to this pressure level is reduced.

The present disclosure is further directed to a system for expanding plastic preforms into plastic containers, which has a plurality of apparatus of the above-described type, wherein these apparatus are disposed on a common carrier. In some aspects, the individual units are moved along a circular path. In this connection, particularly a continuous movement of the individual units is carried out in particular along a circular path.

In some aspects, the control block and the distribution member are implemented as modules which may be separate from each other or which may be separated from each other.

According to various aspects of the disclosure, a blow moulding apparatus for expanding plastic preforms into plastic containers may include a blow piston extending in a longitudinal direction and a blow nozzle extending from the blow piston in the longitudinal direction. The blow nozzle may be configured to apply a gaseous medium to a preform for the expansion thereof. A connection device may be structured and arranged to supply the gaseous medium to the blow moulding apparatus via at least two connection lines, and a control block may be arranged between the connection device and the blow piston. The control block may be configured to control the supply of the gaseous medium during the expansion process using at least partially varying pressure levels and may have a plurality of channels for guiding the gaseous medium. The plurality of channels may be separated from each other at least in sections and may be distributed in a circumferential direction of the control block. At least two valves may be on an outer circumference of the control block. The valves may be distributed in a circumferential direction around the control block, and may be controlled independent of one another for controlling the supply of the gaseous medium to the blow nozzle. A distribution member may be configured to guide the gaseous medium into said channels. The distribution member may be arranged between the connection device and the control block if viewed in the flow direction of the gaseous medium. The channels may extend within the control block at least in sections substantially parallel to the longitudinal direction of the blow piston.

A system for expanding plastic preforms into plastic containers may include a plurality of the aforementioned apparatuses arranged on a common carrier.

Some further advantages and embodiments may become evident from the attached drawings.

DETAILED DESCRIPTION

Figure 1:
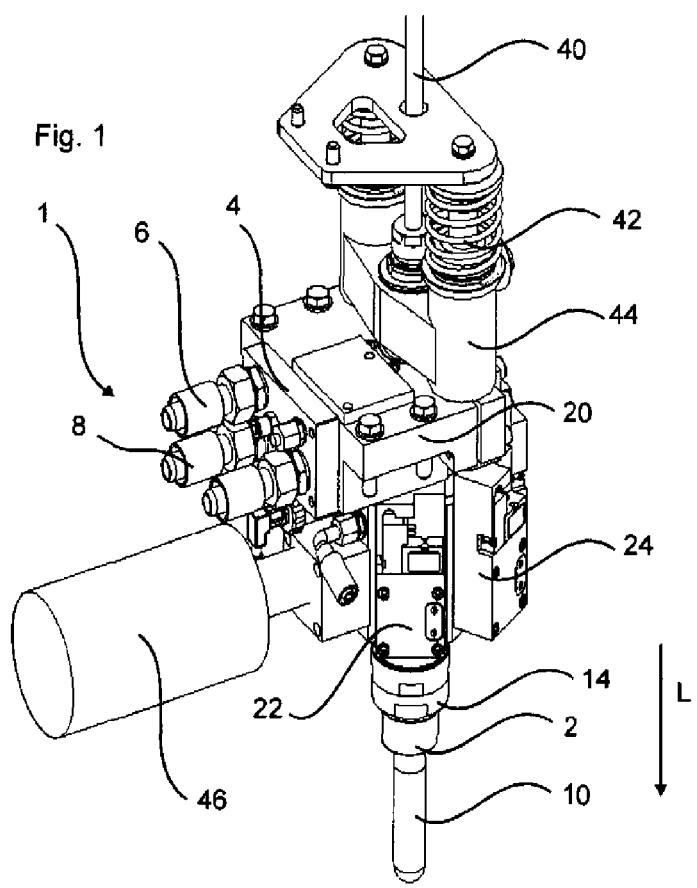
FIG. 1 shows a perspective view of an apparatus according to the disclosure.

FIG. 1 shows a perspective view of an apparatus 1 according to the disclosure. Reference numeral 10 identifies a plastic preform to be expanded, at the outlet of which a blow nozzle 2 is applied. This blow nozzle is disposed on a blow piston 14 extending in the longitudinal direction L. The preform 10, too, extends in this longitudinal direction L.

Reference numerals 6 and 8 relate to connection lines for supplying blow air to the apparatus 1. These connection lines 6 and 8 are disposed here on a connection device or a connection plate 4. A distribution member 20, in turn, is joined on to a connection plate 4 in order to distribute the pressurised air to several flow channels (not shown). Reference numeral 40 identifies a stretching rod for stretching the containers, reference numeral 42 identifies spring means and reference numeral 44 identifies a blow slide.

The apparatus 1 has several valves 22, 24 which are arranged in a circumferential direction around a control block (concealed). Reference numeral 46 identifies a silencer which receives part of the waste air generated during the blow moulding process.

Figure 2:
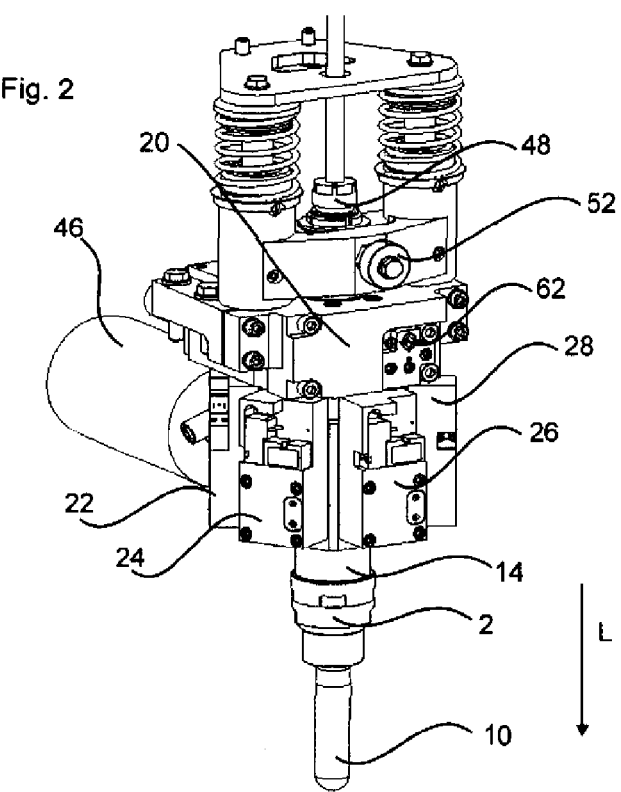
FIG. 2 shows a further view of the apparatus shown in FIG. 1.
Figure 4:
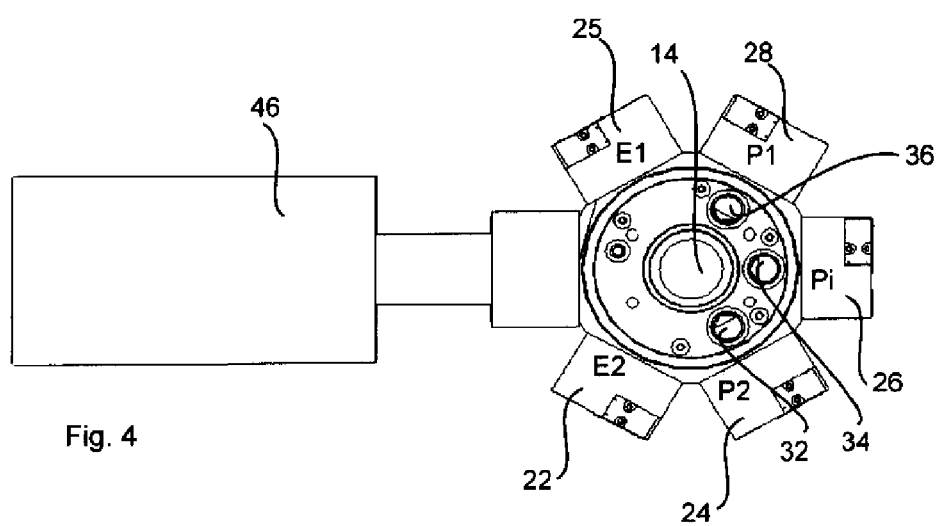
FIG. 4 shows a view of the apparatus from FIG. 3 along the plane A-A from FIG. 3.

FIG. 2 shows a further view of an apparatus according to the disclosure. Shown here again are four valves 22, 24, 26 and 28 which are arranged in the circumferential direction around a control block. The arrangement of the valves as shown in FIG. 2 in principle also allows additional blow valves to be provided. A known embodiment includes these three blow valves for two pressure levels P1 and P2 and an exhaust. However, also four such valves could be provided, with one additional valve being used for recycling the air. Apart from that, also more than four valves may be provided, as shown in FIG. 4. More specifically, it is possible to position five or more valves around the exhaust or the silencer 46 close to the blow chamber, as a result of which the dead volume is reduced and also the discharge time is reduced as a result of the close arrangement. More specifically, the dead volume is reduced in particular not by the valves themselves, but as a result of their geometrical arrangement.

In principle, also embodiments having more than five blow valves are conceivable, as a result of which the geometry of the control block (not shown) would then no longer be hexagonal, but for example heptagonal, octagonal etc.

In general, the control block may have a polygonal outside shape. In this connection, the individual lateral surfaces of this polygonal body are shaped to be flat, which, as a result, facilitates the mounting of the respective blow valves or the carrier thereof.

Referring to FIG. 4, the individual blow valves are further identified also with P1, Pi, P2, E1 and E2. Here, P1 identifies the preblow pressure, P2 the finish-blow pressure. Pi identifies a pressure level between P1 and P2, E1 identifies the first relief valve and E2 the second relief valve. The E2 valve may also take the discharge into a recycling loop via the connection 78 and the line 78b to the silencer 46.

In one possible process it would be initially possible to initiate a starting process at a pressure level P1, subsequently Pi, after that P2, then P1, then Pi and finally first E2 and then E1. By opening the valve P1, first a preblow process is initiated. Subsequently, the corresponding valve P1 is closed. After that, the valve Pi is opened, as a result of which the preform or the bottle is filled at an intermediate pressure level Pi. Subsequently, Pi is closed. After that, P2 is opened, as a result of which the bottle is finish blown, and then P2 is closed again. Finally, valve P1 is opened again, in order to recycle the P1 volume.

Subsequently, the P1 volume is closed and Pi is opened, in order to recycle the Pi volume. Subsequently, Pi is closed again. During final steps, E2 is opened, as a result of which any remaining air may be recycled with recirculation out of the machine. Subsequently, E1 is closed and subsequently E1 is additionally opened, so that any remaining air may escape. Finally, the valves E1 and E2 are closed again. It is to be noted that the symbols P1, P2, E1, E2 and Pi may identify on the one hand the valves, but on the other hand also the pressure levels attained by these valves.

In addition, it would also be possible to work with scavenging air through the stretching rod in the blow moulding process. A number of blow moulding processes and actuating sequences will be explained below.

Referring again to FIG. 2, reference numeral 62 relates to a throttle which is arranged in front of the P1 valve if viewed in the flow direction of the air. Reference numeral 52 identifies a guide roller for a blow slide which may be moved over a cam which is disposed to be stationary.

Reference numeral 48 identifies an upper guide for the stretching rod including a stretch rod seal.

Figure 3:
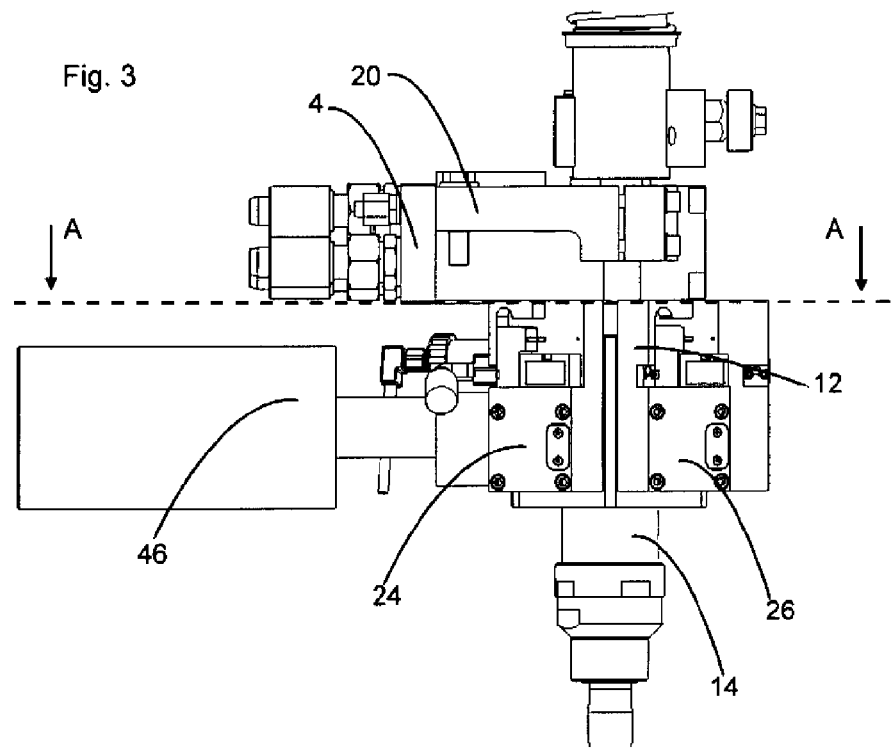
FIG. 3 shows a lateral view of the apparatus from FIG. 1.

FIG. 3 shows a lateral view of an apparatus according to the disclosure. It can be seen here that the distribution device 20 is disposed above the control block 12 or the control block joins directly on to this distribution device 20. The connection is carried out, as mentioned above, via the air connection plate 4. In this connection device 4, the required pressure levels are made available. On or in the control block 12, the individual air channels are guided parallel to the blow piston 14, as shown in detail below. In this way, as mentioned above, any dead space may be reduced.

It can further be seen that the individual valves 24 and 26 are also arranged in the circumferential direction around the blow piston 14, so that the air duct to the blow chamber disposed above the blow piston is short, as a result of which the dead volume in the blow chamber is reduced. The silencer 46, too, is directly linked to the control block 12 via a connection. In this way, the dead times for the discharge are reduced.

FIG. 4 shows a top view of the apparatus along the line A-A from FIG. 3. It can be seen here to which of the individual valves 22 to 28 the various pressure levels P1, Pi, P2 as well as the exhaust levels E1 and E2 are respectively allocated.

The sectional view further shows three channels 32, 34 and 36 extending here in the longitudinal direction L, i.e. vertically relative to the figure plane. These channels are each separate from one another and lead to the individual valves 24, 26 and 28. It can be seen that in this way the individual channels 32, 34 and 36 each extend exactly parallel to the longitudinal direction or that any transverse bores may be dispensed with, as a result of which in turn any dead space is reduced.

Figure 5:
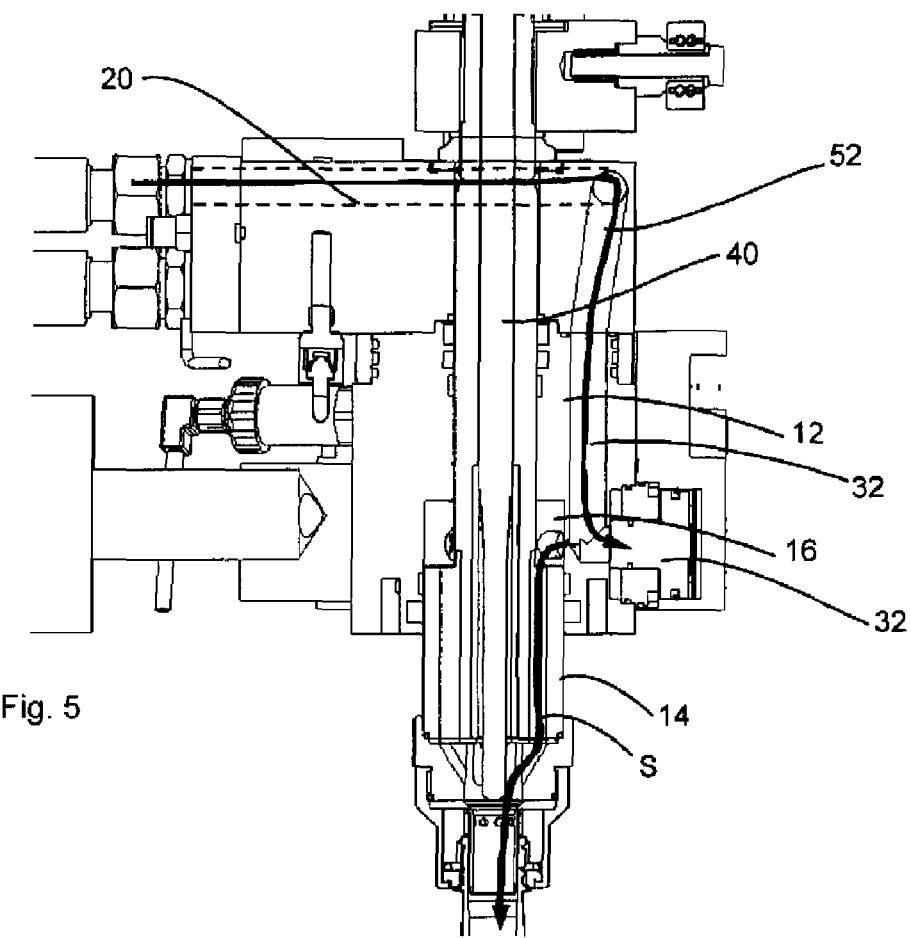
FIG. 5 shows a further sectional view of the apparatus according to the disclosure for illustrating the flow patterns.

FIG. 5 shows an illustration of an apparatus according to the disclosure. It can be seen here that each of the individual valves has its own valve body in a lower area of the control block 12 or its outlet opens directly into the blow chamber 16. In this way, too, the dead volume downstream of the valve may be reduced. The individual flows are reunited in the blow piston 14. Reference letter S generally identifies a flow path or an air duct for the blow valves. In FIG. 5, too, it can be seen that the blow chamber 16 is disposed directly above the blow piston 14.

Figure 6:
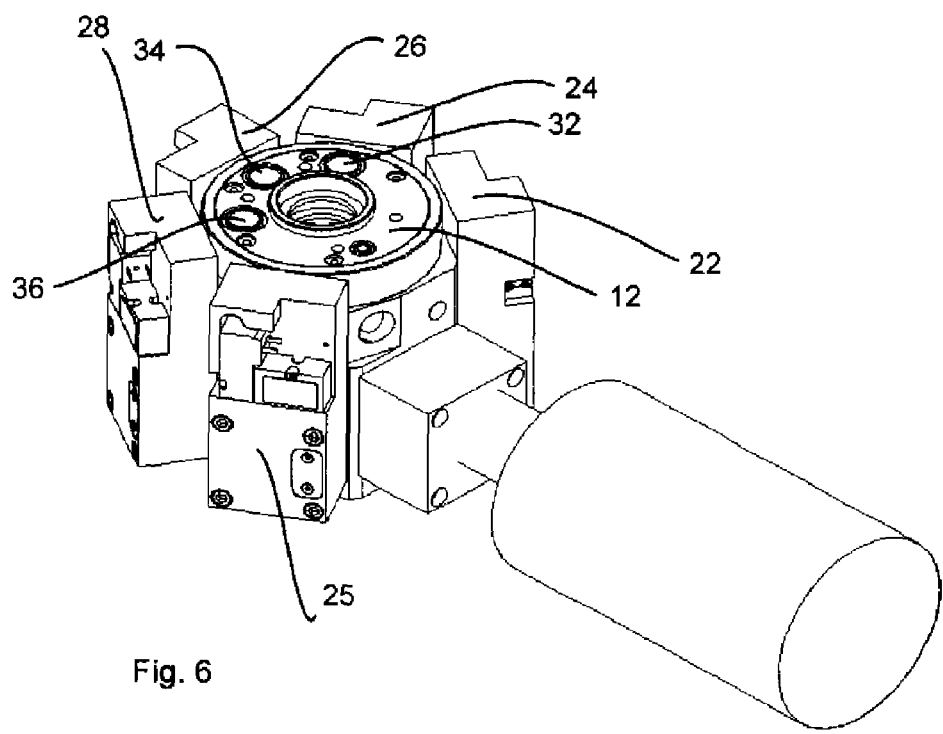
FIG. 6 shows a detailed view of an apparatus according to the disclosure.

FIG. 6 shows a further view of an apparatus according to the disclosure. Here again it can be seen that the individual valves are arranged in the circumferential direction around the control block 12 and also the individual channels 32, 34 and 36 are spaced from one another in the circumferential direction.

Figure 7:
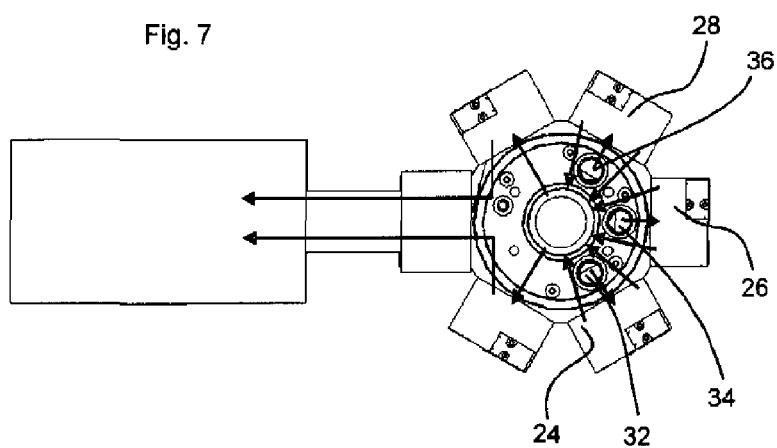
FIG. 7 shows a view of an apparatus according to the disclosure in a further embodiment.

FIG. 7 shows a further embodiment of an apparatus according to the disclosure. Here, too, the individual valves 24 to 28 are arranged in the circumferential direction around the control block 12. However, as indicated by the individual arrows, the air can flow here from each individual valve respectively over two paths which are separate from each other in the direction of the puffer piston (not shown).

Figure 8:
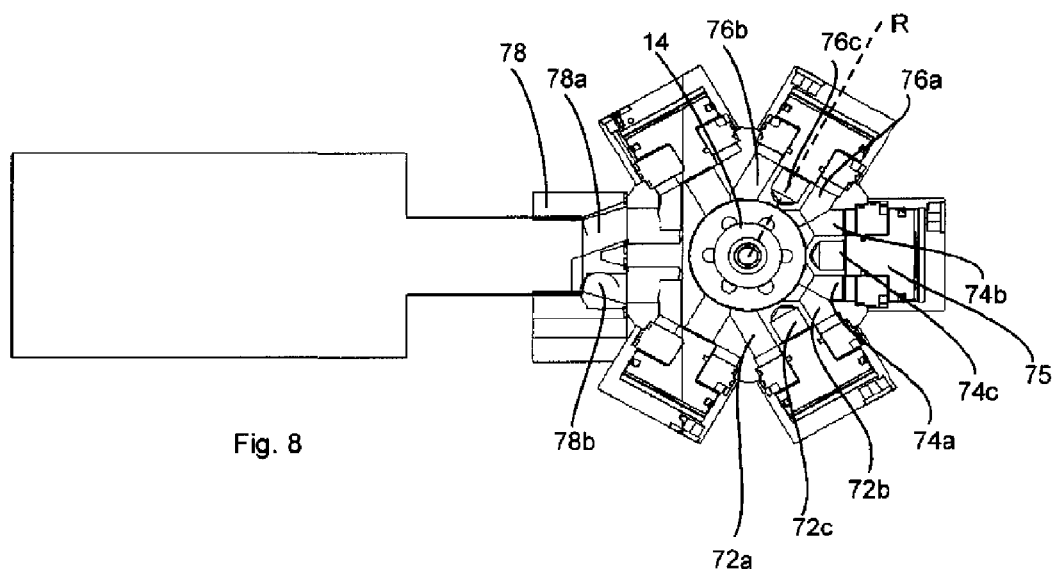
FIG. 8 shows a further view for illustrating the embodiment shown in FIG. 7.

FIG. 8 illustrates this situation in more detail. It can be seen that each individual valve has two air discharge lines 72a, 72b, 74a, 74b, 76a, 76b, which are used as air exhausts away from the individual blow valves. Apart from that, one air supply line, respectively, to the respective valves is provided, with each valve having associated with it only one such line 72c, 74c, 76c, respectively. The two air discharge lines 72a, 72b . . . 76a, 76b, respectively, do not extend exactly in the radial direction, but are symmetrical with regard to a radial direction which, as shown in FIG. 8, extends for example through the air supply line 76c. This radial direction is identified with the reference letter R. The lines 72a and 72b may have the same diameter. Also the lines 74a and 74b have the same diameter. However, the diameters of the lines 72a, 72b on the one hand and the lines 74a, 74b on the other hand may also be different from each other. In some aspects, the connection channels 72a . . . 76b are part of the channels 32, 34.

Reference numeral 75 respectively relates to a valve piston of each valve. The blow piston 14 can also be seen, however, here it is below the valves. Here, the individual valve pistons may have for example a constant cylindrical cross section. However, it would also be conceivable for the respective end faces of the valve pistons to have different sizes. Thus, it would be possible that the end face of the valve piston, to which pressure is applied for moving the piston, is larger than the opposite end face.

In an embodiment, at least one end face of at least one valve piston and, in some aspects, the end faces of several valve pistons protrude, in a closed condition of the respective valve, towards the blow piston or the blow nozzle in such a way that a radial distance between this end face and the blow nozzle is less than 4 cm, in some aspects, less than 3 cm, in some aspects, less than 2 cm, in some aspects, less than 1 cm, and in some aspects, less than 0.5 cm.

In an exemplary embodiment, the valve body is disposed in a valve seat and this valve seat contacts the blow piston or the blow nozzle.

Figure 9:
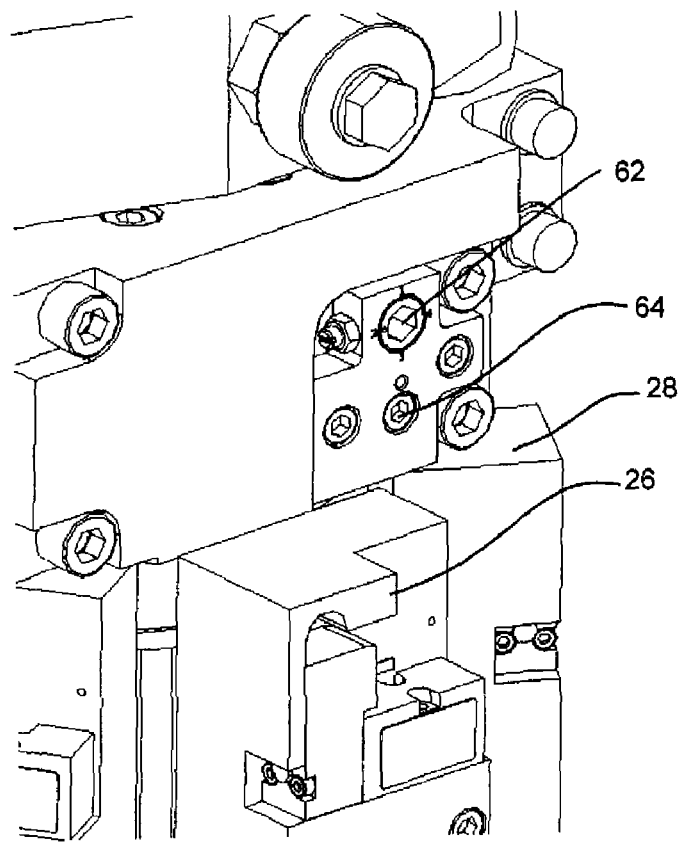
FIG. 9 shows a detailed view of an apparatus according to the disclosure in a further embodiment.

FIG. 9 shows a further embodiment of an apparatus according to the disclosure. In this case, an arrangement including a throttle 62 and a check valve 64 is provided upstream of the valve 28, which means of the pressure level P1. Here, both the throttle 62 and the check valve 64 are arranged upstream of the actual blow valve 28.

Figure 10:
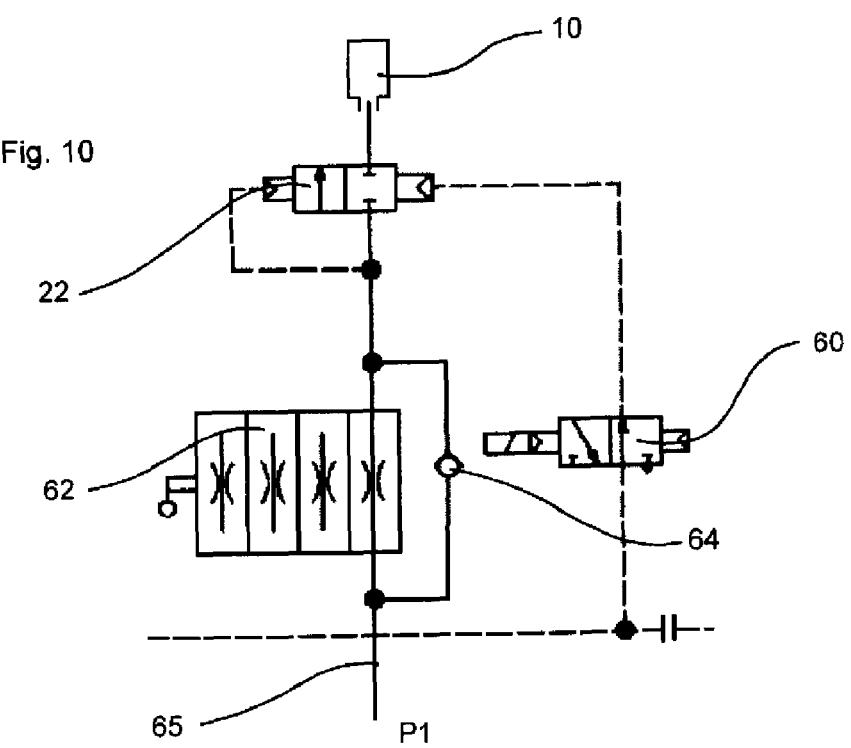
FIG. 10 shows a circuit diagram for illustrating a further exemplary embodiment.

FIG. 10 shows a circuit diagram of this arrangement. A discharge may be implemented via the check valve 64, as was mentioned above. Reference numeral 60 identifies a control valve for actuating the actual valve 28. Reference numeral 10 identifies the container to be expanded.

The throttle 62 is designed in four stages here and is manually actuated. The P1 pressure level is supplied via the line 64, which is also shown in FIG. 10.

Figure 11:
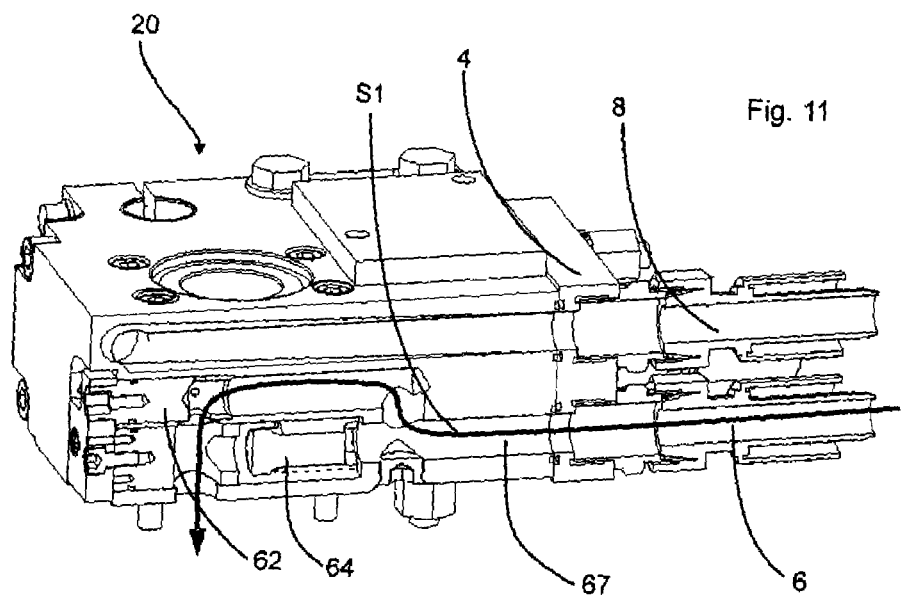
FIG. 11 shows a detailed view for illustrating an exemplary embodiment.

FIG. 11 shows a sectional view of an apparatus according to the disclosure for generating the pressure level P1 or the method step in which a preblown parison is generated. The air for filling the preblown parison is supplied through the throttle 62 via the P1 valve to the preform. In this situation, the check valve 64 is closed.

Figure 12:
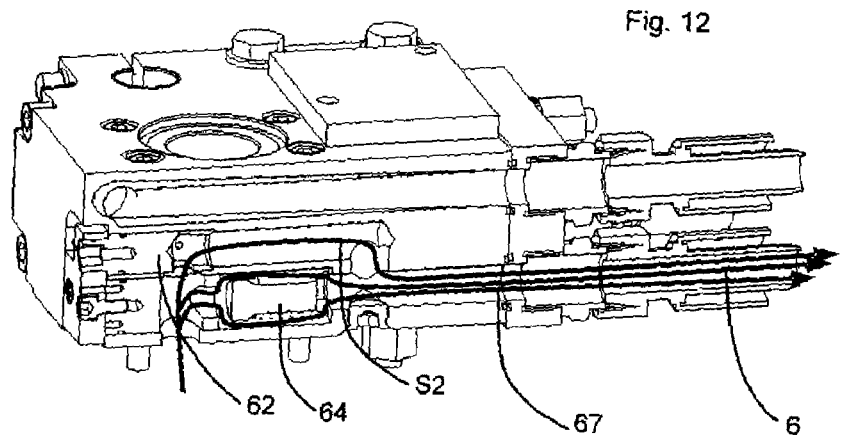
FIG. 12 shows a detailed view for a pressurised air duct for the apparatus from FIG. 11.

FIG. 12 shows the respective process for P1 recycling to the P1 pressure level. Here, the air from the bottle is carried back into the P1 stream via the throttle 62 and channel 67 and, also the check valve 64. By using the check valve 64, this process time is minimised.

Figure 13:
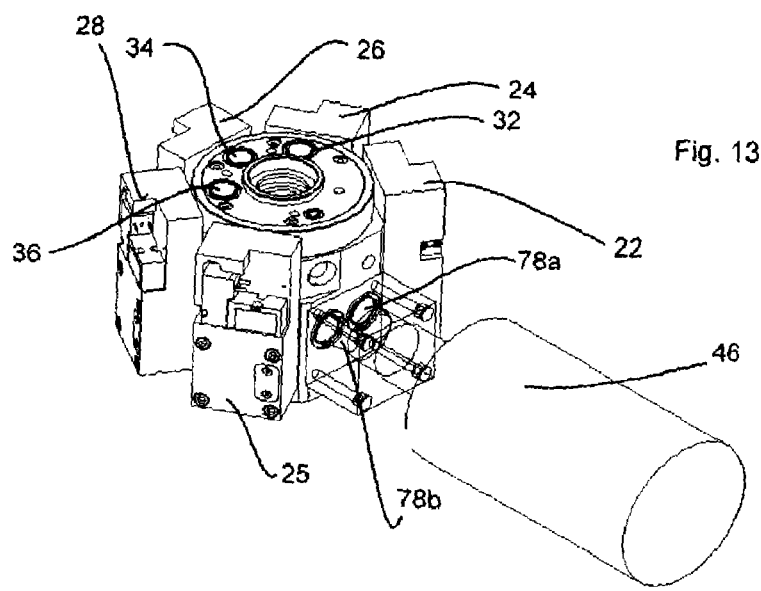
FIG. 13 shows a further perspective view of an apparatus according to the disclosure.

FIG. 13 shows a perspective view of an apparatus according to the disclosure. Here in particular also the two connection lines 78a and 78b are shown, which open into the silencer 46. However, it would also be possible for the lines to open into a recycling channel.

Figure 14:
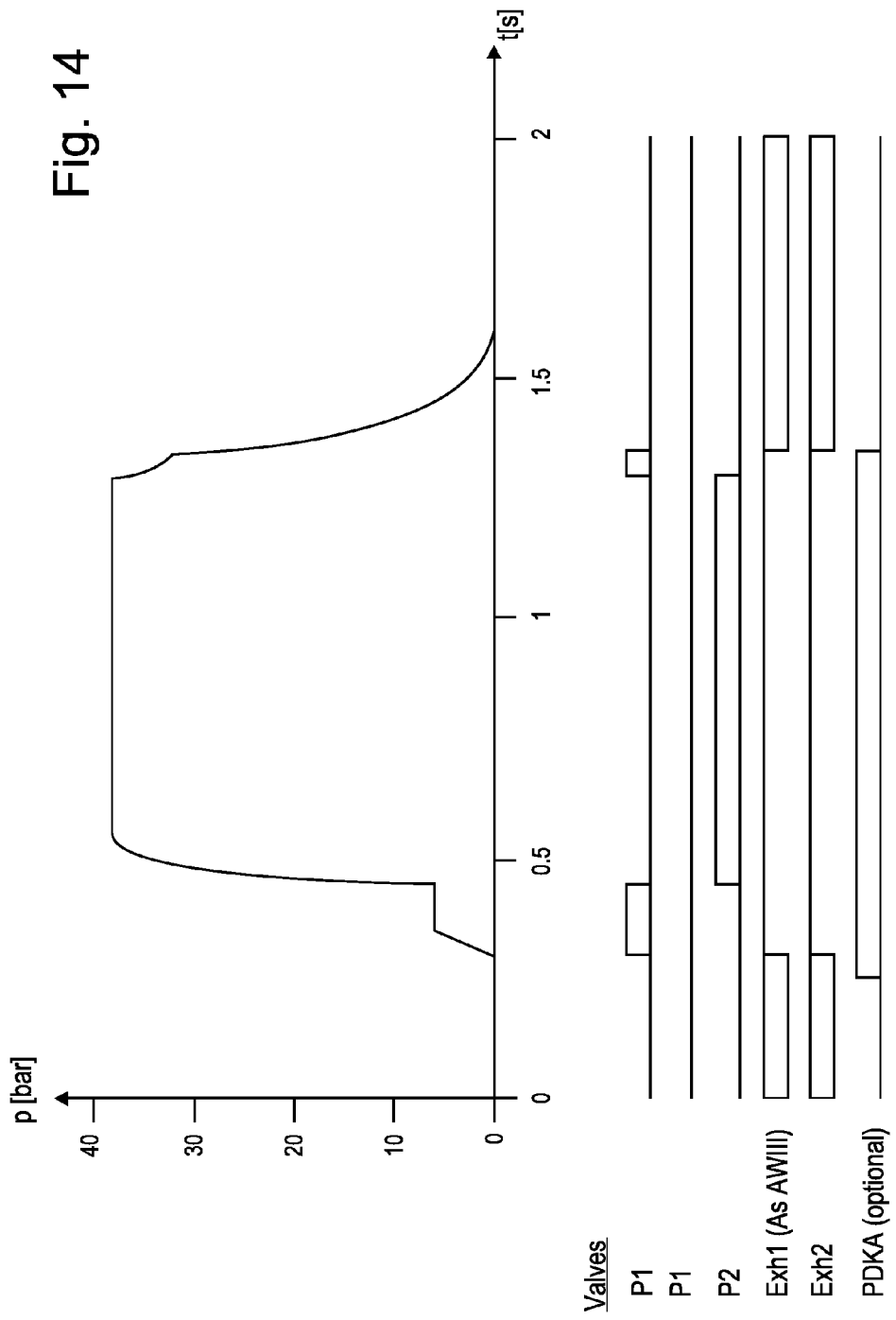
FIG. 14 shows a view of a diagram for illustrating a blow moulding process.
Figure 15:
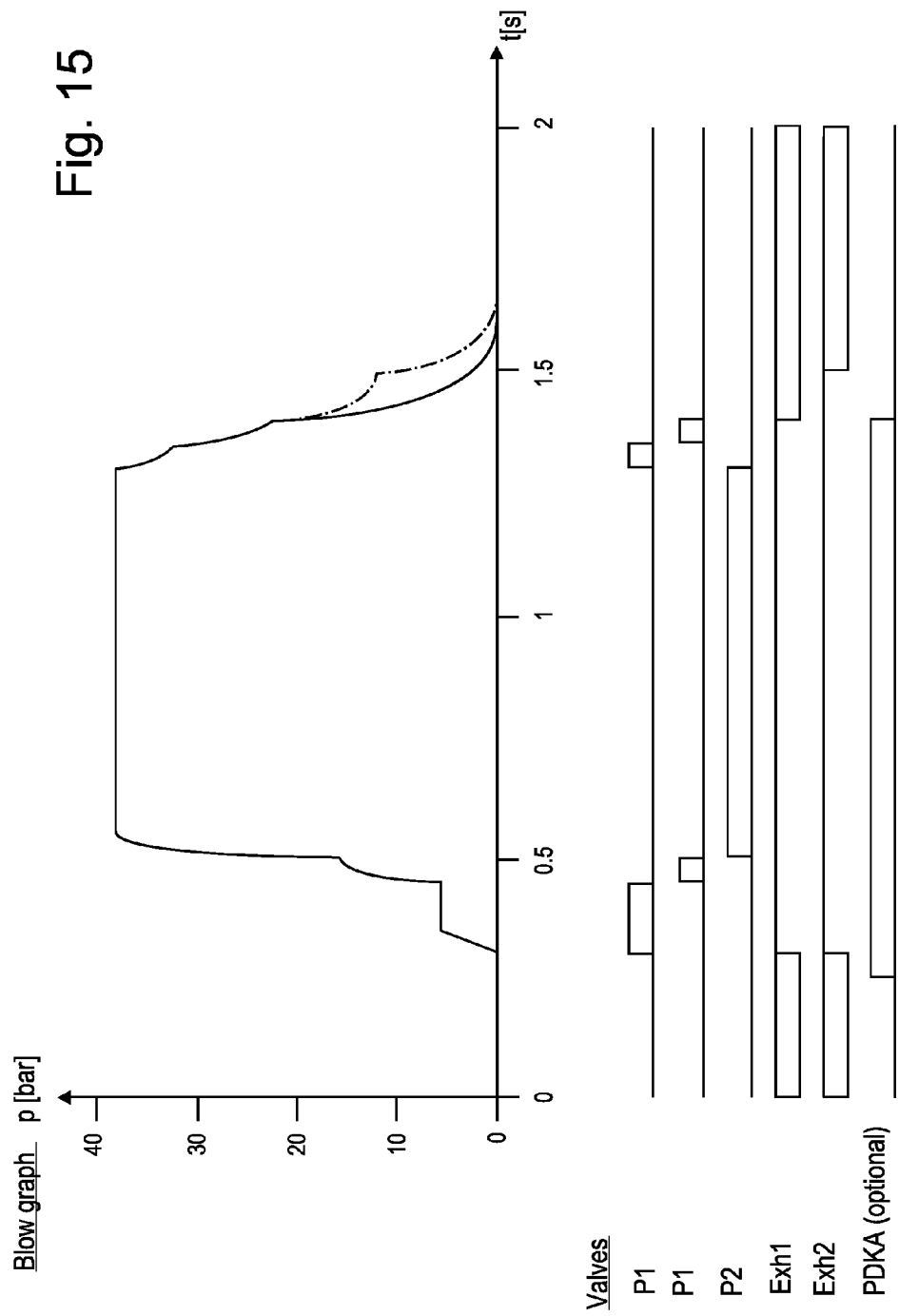
FIG. 15 shows a further diagram for illustrating a blow moulding process.

FIGS. 14 and 15 show two possible processes for expanding a plastic preform. Whilst in the process shown in FIG. 4 only the pressure levels P1 and P2 as well as the discharge levels E1 and E2 are used, in the case of the process shown in FIG. 15, which is of a slightly more complex design, also the pressure level Pi is used with a further switching valve.

FIGS. 16 to 22 show further embodiments of valve arrangements. In FIGS. 16 to 22, reference numeral 30 relates in each case to a blow mould in which a plastic preform (not shown) is disposed during the expansion process. The blow nozzle 2 seals, as mentioned above, against this plastic preform during the expansion process. Although the distribution member 20 and the control block 12 (also referred to as a valve block) are separate components, they are mounted to be fixed relative to each other. Reference numeral 60 in turn identifies the control valve which is arranged on the outer perimeter of the control block. The air is supplied via channel 67 and further via channel 32 as mentioned above. In various aspects, the distribution member is arranged as a particularly separate component between the connection device and the control block. However, in general it would also be possible for the connection device to be arranged directly on the control block and in this way to take over the function of the distribution member.

Depending on the position of the valve piston 75, the air supply into a channel 38 which is disposed in the blow nozzle and which feeds the air to the blow nozzle, is enabled or blocked. In this connection, the channel 32 extends here in the control block in a radial direction of the valve piston 75, so that the pressurised air impinges laterally onto the valve piston. In this way, the dead space may be reduced even further.

Reference numeral 77 relates to sealing means, by means of which the valve piston 75 is sealed against a valve cavity 73. Reference numeral 24 in turn identifies the valve in general.

Figure 16:
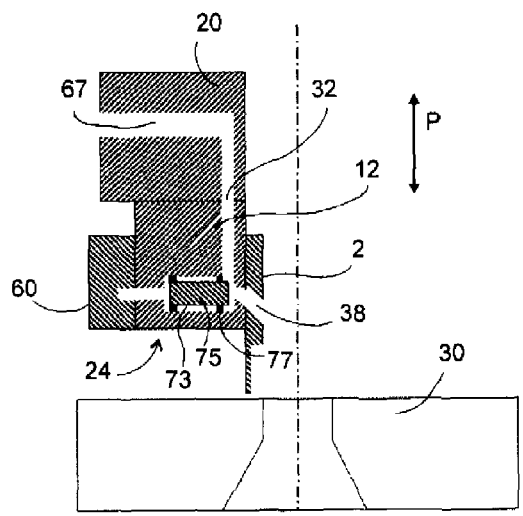
FIG. 16 shows a schematic view for illustrating a valve.
Figure 17:
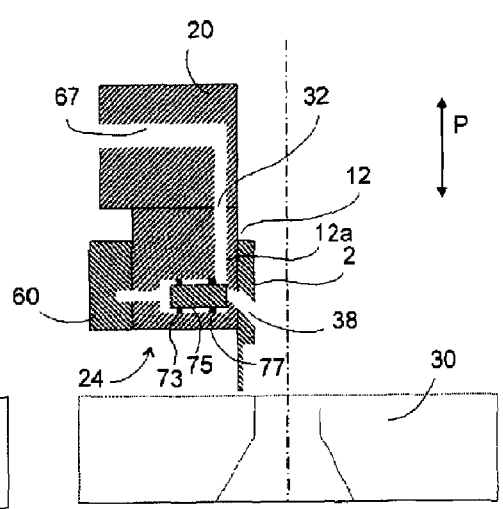
FIG. 17 shows a view from FIG. 16 with the valve closed.

FIG. 17 shows a view where, in contrast to the view shown in FIG. 16, the valve 24 is closed. Here, too, it can be seen that the channel section 38 extends obliquely downwards within the blow nozzle. In the embodiment shown in FIGS. 16 and 17, the control block 12 as well as the distribution member 20 are moved upwards and downwards (arrow P) together with the blow nozzle. However, it would also be possible for the distribution member 20 and the control block to be mounted stationary and for the blow nozzle 2 to be movable with respect to the control block 12. In the latter case, the channel 38 is also closed by the control block 12 moving upwards. The valve piston seals against a wall 12a of the control block 12.

Figure 18:
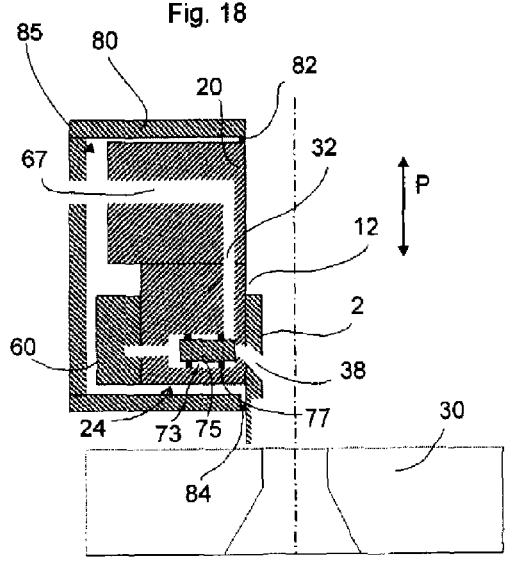
FIG. 18 shows a further exemplary embodiment including a hygiene protection chamber.

FIG. 18 shows a further embodiment in which besides the arrangements shown in FIGS. 16 and 17, a surrounding wall 80 is additionally provided, which is disposed opposite the distribution member 20 or the blow nozzle 2 by means of sealing means 82, 84. This wall 80 forms here a hygiene protection chamber 85 to provide for easy cleaning of the entire apparatus. Furthermore, this wall may be detached quickly to allow each valve to be exchanged if this becomes necessary.

Figure 19:
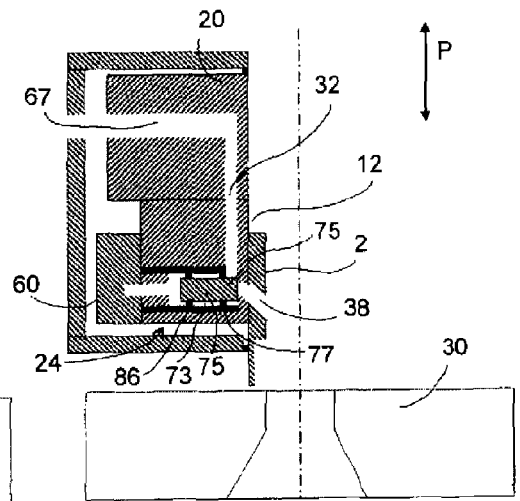
FIG. 19 shows a further exemplary embodiment having a slide bush for the valve.

FIG. 19 shows a further embodiment of an apparatus according to the disclosure. Here, the valve body 75 is located in a slide bush 86, so that the valve may be exchanged quickly, and in this way both the bush 86 and the valve piston 75 may be quickly exchanged.

Figure 20:
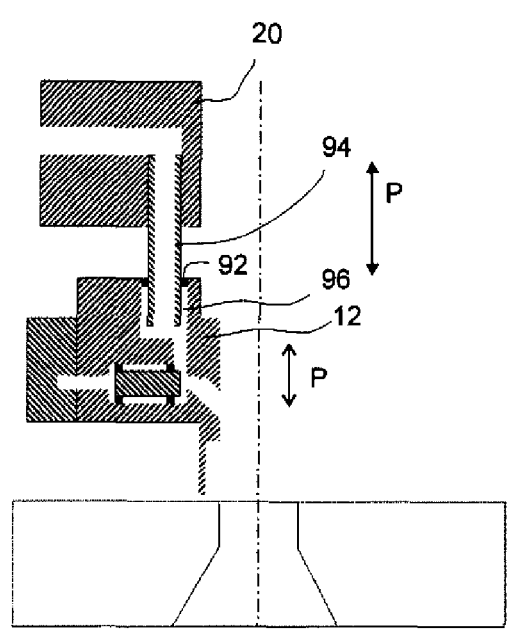
FIG. 20 shows an embodiment wherein the distribution member and the control block are movable relative to each other.

FIG. 20 shows a further embodiment of the apparatus according to the disclosure. In this embodiment, the blow nozzle 2 and the control block 12 are integrally formed or are fixedly connected to each other. The movement of these two elements along the double arrow P may, for example, be servo driven or may also be driven by a linear motor or may be carried out in a cam-controlled manner. The distribution member 20 in this embodiment are formed to be stationary, which means they do not move in the direction P. Reference numeral 92 relates to sealing means, by means of which a channel or a piece of pipe 94 is sealed movably with respect to a corresponding recess 96 which is disposed in the control block. Conversely, it would also be possible to arrange the recess 96 in the distribution member and conversely to integrally provide the piece of pipe 94 on the control block 12.

Figure 21:
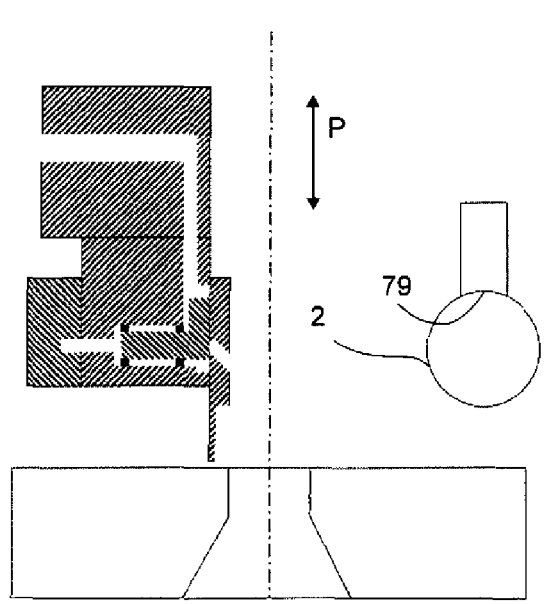
FIG. 21 shows an embodiment having a concentric end face design of the valve piston.

FIG. 21 shows a further embodiment of the apparatus according to the disclosure. In this embodiment, the valve piston 75 has a surface or end face 79 (see right-hand partial image), the curvature of which is formed concentrically to the blow nozzle 2. In this way, the valve piston or the end face thereof may be brought even closer to the blow nozzle, in order to reduce in this way any dead volume even further. In this embodiment, the blow nozzle may be movable relative to the control block 12.

Figure 22:
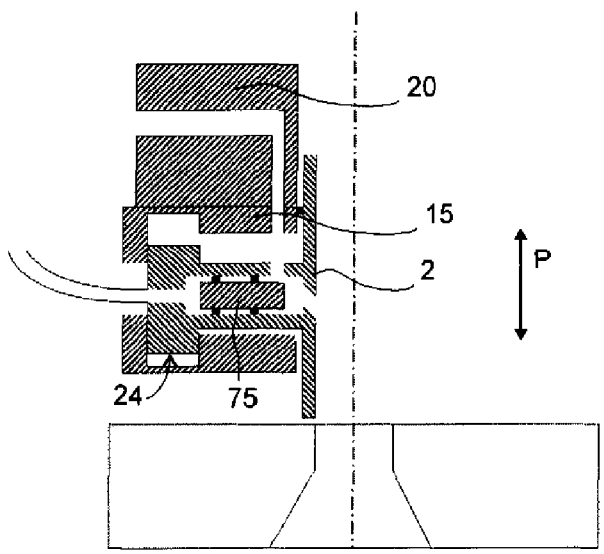
FIG. 22 shows an embodiment having a movable control valve.

FIG. 22 shows a further embodiment of the apparatus according to the disclosure. In this apparatus, the blow nozzle 2 is connected to the valve 24. The valve body 75 or the valve 24 is, as shown, axially guided here in the control or valve block 12. Thus, in this embodiment, the control valve 60, the blow valve 24 and the blow nozzle 2 are connected to each other. In contrast to this, the distribution member 20 may be arranged to be immovable in the direction P, with the control block 12 including a housing 15, within which the entire valve 24 is movable in the direction P.

It will be apparent to those skilled in the art that various modifications and variations can be made to the blow moulding apparatuses and processes of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. A blow moulding apparatus for expanding plastic preforms into plastic containers, comprising:
   a blow piston extending in a longitudinal direction;
   a blow nozzle extending from the blow piston in the longitudinal direction, the blow nozzle being configured to apply a gaseous medium to a preform for the expansion thereof;
   a connection device structured and arranged to supply the gaseous medium to the blow moulding apparatus via at least two connection lines;
   a control block arranged between the connection device and the blow piston, the control block being configured to control the supply of the gaseous medium during the expansion process using at least partially varying pressure levels, the control block having a plurality of channels for guiding the gaseous medium, the plurality of channels being separated from each other at least in sections, the plurality of channels being distributed in a circumferential direction of the control block;
   at least two valves on an outer circumference of the control block, said valves being distributed in a circumferential direction around the control block, said valves being controlled independent of one another for controlling the supply of the gaseous medium to the blow nozzle; and
   a distribution arrangement configured to guide the gaseous medium into said channels, said distribution member being arranged between the connection device and the control block if viewed in the flow direction of the gaseous medium, said channels extending within the control block at least in sections substantially parallel to the longitudinal direction of the blow piston.

2. The apparatus as claimed in claim 1, wherein the plurality of channels extend within the control block up to the at least two valves exclusively parallel to the longitudinal direction.

3. The apparatus as claimed in claim 1, further comprising at least one exhaust outlet for the gaseous medium on the outer perimeter of the control block.

4. The apparatus as claimed in claim 1, further comprising a blow chamber between the blow piston and the control block, the plurality of individual channels opening into the blow chamber.

5. The apparatus as claimed in claim 4, wherein the blow chamber is joined directly on to the valves.

6. The apparatus as claimed in claim 1, wherein at least one valve is in flow communication with the blow piston via two connection channels separated from each other at least in sections.

7. The apparatus as claimed in claim 6, wherein the connection channels are arranged symmetrically with regard to a geometrical connection line between the control block and the corresponding valve.

8. The apparatus as claimed in claim 1, further comprising a connection for supplying a gaseous medium for controlling at least one of said valves.

9. The apparatus as claimed in claim 1, further comprising a rod body movable with respect to the blow piston in the longitudinal direction for streching the plastic preforms.

10. The apparatus as claimed in claim 1, further comprising a throttle device between the connection device and at least one of said valves if viewed in the flow direction of the gaseous medium.

11. The apparatus as claimed in claim 10, further comprising a check valve parallel to the throttle device.

12. A system for expanding plastic preforms into plastic containers, the system comprising:
   a plurality of apparatuses as claimed in claim 1, the plurality of apparatuses being arranged on a common carrier.

* * * * *